UNITED STATES PATENT OFFICE.

ALFRED J. SHILTON, OF BIRMINGHAM, COUNTY OF WARWICK, ENGLAND.

DISINFECTANT.

SPECIFICATION forming part of Letters Patent No. 344,056, dated June 22, 1886.

Application filed May 28, 1884. Renewed May 5, 1886. Serial No. 201,243. (Specimens.) Patented in England January 7, 1884, No. 852.

*To all whom it may concern:*

Be it known that I, ALFRED J. SHILTON, a subject of the Queen of Great Britain, and a resident at Birmingham, county of Warwick, England, have invented a new and useful Improvement in Disinfectants, of which the following is a specification.

This invention relates to improvements in disinfectants.

My invention consists of a mixture of ammonium chloride, potassium iodide dissolved in water, and iodine.

To prepare my mixture, take eight (8) ounces of ammonium chloride; then add thereto two (2) ounces of potassium iodide dissolved in one-half ($\frac{1}{2}$) pint of water; to this add one-half ($\frac{1}{2}$) ounce of iodine. The quantity of one (1) gallon of water is then added, and the whole compound is mixed together and ready for use.

The compound containing the above-named ingredients possesses properties greatly necessary in the formation of a successful disinfectant.

The method of using my disinfectant is to dilute the liquid with at least ten times its bulk of water before use.

For pouring down drains, use fifteen (15) to twenty (20) volumes of water.

To purify or disinfect bed-rooms, hospitals, &c., distribute the diluted liquid by a spray-producer or by a sprinkling device. Another mode is to expose it in flat open vessels.

The novelty of this mixture consists in the addition of the ammonium chloride to the other ingredients in the proportions hereinbefore mentioned.

Having thus described my invention, I desire to claim—

In a disinfectant, the combination of potassium iodide with iodine, ammonium chloride, and water, in the proportions hereinbefore described.

In testimony that I claim the foregoing as my invention I have signed my name, in presence of two witnesses, this 26th day of April, 1884.

ALFRED J. SHILTON.

Witnesses:
HENRY SHILTON,
THOMAS JOHNSON.